United States Patent [19]
Toyota et al.

[11] Patent Number: 6,102,576
[45] Date of Patent: Aug. 15, 2000

[54] BEARING ASSEMBLY

[75] Inventors: Hiroshi Toyota, Tondabayashi; Manabu Kai, Fujiidera, both of Japan

[73] Assignee: Koyo Seiko Co., Ltd., Osaka, Japan

[21] Appl. No.: 09/228,656

[22] Filed: Jan. 12, 1999

[30] Foreign Application Priority Data

Jan. 14, 1998 [JP] Japan ................................. 10-017788

[51] Int. Cl.[7] .................................................. F16C 19/02
[52] U.S. Cl. ........................... 384/492; 74/459; 384/908
[58] Field of Search .................... 384/492, 565, 384/463, 908, 43; 74/459

[56] References Cited

U.S. PATENT DOCUMENTS 3,001,838  9/1961  Lamson et al. ........................ 384/463
5,207,513  5/1993  Kondo et al. .......................... 384/492
5,222,816  6/1993  Kondoh et al. ........................ 384/463
5,741,078  4/1998  Sasaki .................................... 384/43
5,782,135  7/1998  Kondo et al. ............................ 74/459

*Primary Examiner*—Thomas R. Hannon
*Attorney, Agent, or Firm*—Jacobson, Price, Holman & Stern, PLLC

[57] ABSTRACT

A lubrication film 5 is formed of a solid lubricant including PTFE (polytetrafluoroethylene) having a mean molecular weight of not more than 25,000 and a mean particle size of not less than 5 $\mu$m and less than 10 $\mu$m. The films 5 adhere to balls 3, raceway tracks 1$a$, 2$a$ and a retainer 4 of a bearing assembly. The solid lubricant thus adhered to each portion has a property that PTFE particles are dispersed without a binder.

4 Claims, 5 Drawing Sheets

BEARING ASSEMBLY

FIELD OF THE INVENTION

The present invention relates generally to a bearing assembly and more particularly, to a bearing assembly for use in special environments such as of high vacuum, high temperatures and cleanliness.

DESCRIPTION OF THE PRIOR ART

A solid lubricant is generally used for lubrication of bearing assemblies such as roller bearings, ball-screw bearings and ball-spline bearings for use in vacuum devices, semiconductor fabricating apparatuses, liquid-crystal-substrate fabricating apparatuses and the like. In particular, polytetrafluoroethylene (hereinafter simply referred to as "PTFE") is used as a low dusting solid lubricant. PTFE together with a binder such as polyamide, polyimide and the like are applied to a roller body and a raceway track of the bearing assembly. PTFE is in the form of either a polymer having a mean molecular weight of hundreds of thousands to several millions or a telomer having a mean molecular weight of not more than 25,000. PTFE with a particle size of 10 to 20 μm is widely used.

However, a working temperature limit for the aforementioned bearing assembly is as low as 200° C. in vacuum. This principally results from a working temperature limit for polyamide or polyimide which is used as the binder for the solid lubricant. Such binders produce gas when the temperature is rising up to about 200° C., and the binder tends to separate from the roller body and the raceway track. This also facilitates the separation of the solid lubricant, which results in contamination due to dusting or a degraded lubricity.

OBJECT AND SUMMARY OF THE INVENTION

To solve the above problems, an object of the present invention is to provide a bearing assembly of the solid lubricant type with improved heat resistance and both good-lubricity and low-dusting characteristic even in the high temperature environment.

For achieving the above object, the bearing assembly of the present invention comprises:

a roller body;

a raceway track for guiding the roller body; and a lubrication film formed of a solid lubricant adhered to at least one of surfaces of the roller body and the raceway track with a property that particles of lubricant are dispersed in binder-less condition, the solid lubricant including polytetrafluoroethylene having a mean molecular weight of not more than 25,000 and a mean particle size of not less than 5 μm and less than 10 μm.

Inasmuch as the above bearing assembly employs the solid lubricant including PTFE having the mean molecular weight of not more than 25,000, there is no fear that the solid lubricant blocks a gap between the roller body and the raceway track or that PTFE particles become aggregated. In addition, the PTFE particles having the mean particle size of not less than 5 μm and less than 10 μm provide a more positive aggregation prevention. Thus, a rotation failure of the bearing assembly can be prevented. Further, the lubrication film is formed of the solid lubricant including dispersed PTFE particles without using the binder whereby the working temperature limit for the lubrication film may be increased to the working temperature limit for PTFE. This prevents the occurrence of dusting due to the separated lubrication film and the degradation of lubricity even under the high temperature conditions.

The lubrication film of the bearing assembly of the present invention features an excellent heat resistance, a good lubricity and a low dusting characteristic, thus permitting the use of the bearing assembly in the special environments such as of high vacuum, high temperature, and cleanliness.

Even in the case of a bearing assembly with a retainer, a similar lubrication film to the above may be formed on at least one of the surfaces of the retainer and the roller body. In such bearing assembly too, the lubrication between the roller body and the retainer has an improved heat resistance and both a good lubricity and a low dusting characteristic under the high temperature conditions.

In the above solid lubricant, PTFE preferably has a mean molecular weight in the range of between 7,000 and 15,000. With the mean molecular weight of not more than 15,000, the PTFE particles are further reduced in size, thus contributing to a further improved lubricity and separation resistance of the lubricant. With the mean molecular weight of not less than 7,000, the PTFE particles do not start producing gas at low temperatures, thus contributing to a further improved heat resistance of the lubricant. Accordingly, the bearing assembly of the present invention is more suitable for use in the special environments such as of high vacuum, high temperature and cleanliness.

DESCRIPTION OF THE PREFERRED EMBODIMENTS

Hereafter, a preferred embodiment of the present invention will be described with reference to the accompanying drawings.

Figure 1:
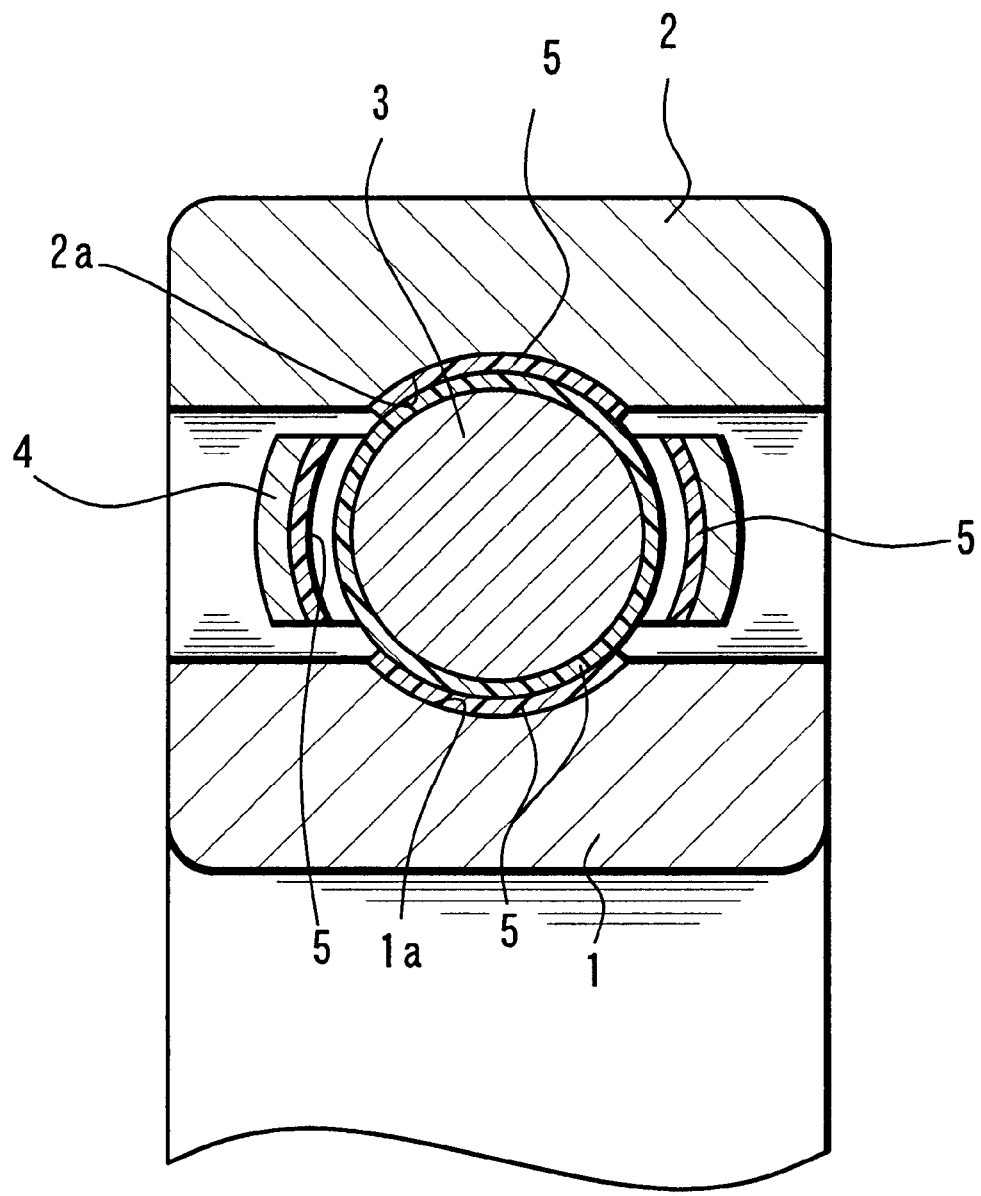
FIG. 1 is a sectional view showing a bearing assembly (roller bearing) in accordance with one embodiment hereof.

FIG. 1 is a sectional view showing a bearing assembly (roller bearing) according to one embodiment of the present invention. The roller bearing includes an inner ring 1, an outer ring 2, a plurality of balls 3 as the roller body, and a retainer 4 for retaining the balls 3. The inner ring 1 and the outer ring 3 are disposed in concentric relation, and the balls 3 are interposed therebetween. Lubrication films 5 are formed on the balls 3, a pocket (a concave on the inner side) of the retainer 4 and respective raceway tracks 1a and 2a of the inner ring 1 and the outer ring 2 by which the balls 3 are guided. The films 5 are made by solid lubricant adhered to the above-mentioned respective portions without using any binder. Under this binder-less condition (the absence of the binder), the solid lubricant has a property that the PTFE particles are allowed to be dispersed, thereby avoiding aggregation of the PTFE particles. A usable PTFE has a mean molecular weight of not more than 25,000, preferably in the range of between 7,000 and 15,000, a mean particle size of not less than 5 µm and less than 10 µm and a melting point of between 310 and 320° C.

The aforementioned lubrication film 5 is formed in the following manner.

First, a solution is prepared by dispersing the aforementioned PTFE in an organic solvent including $CH_3CCl_2F$, a kind of flon substitute (hereinafter, simply referred to as "flon substitute"). In this step, PTFE particles are dispersed without combining with one another. Next, a given amount of the resultant solution is dripped onto the raceway tracks 1a and 2a by means of a micro-cylinder and thereafter, the bearing is rotated several times to spread the solution. When the solution is evenly spread over the surfaces of the raceway tracks 1a and 2a, a hot-air drying process is applied to the bearing assembly at about 100° C. for several minutes. This causes the evaporation of the organic solvent thereby leaving a PTFE coating (normally, the coating being spread like dots).

Aside from the aforementioned method, the lubrication film 5 may also be formed by the steps of dipping a completed bearing assembly in the solution wherein PTFE particles are dispersed in the flon substitute, and then subjecting the bearing assembly to the hot air drying at about 100° C.

If the mean molecular weight of PTFE exceeds 25,000, there is a detrimental tendency of the solid lubricant to block the gap between the balls 3 and the raceway track 1a or 2a as well as of the PTFE particles to produce aggregation. This may result in the rotation failure of the roller bearing assembly. In contrast, the roller bearing assembly of the above configuration employs the PTFE with the mean molecular weight thereof limited to 25,000 or less, thus eliminating the fear that the solid lubricant blocks the gap or the PTFE particles become aggregated. Further, if the PTFE particles have the mean particle size of less than 5 µm, the PTFE particles tends to produce the aggregation. However, the roller bearing assembly of the above configuration employs the PTFE with the mean particle size of not less than 5 µm and less than 10 µm and hence, the aggregation of the PTFE particles can be more positively prevented. Thus is ensured the prevention of the rotation failure of the bearing assembly.

Further, the adhesion of PTFE alone is accomplished without using the binder thereby permitting the working temperature limit for the lubrication film 5 to be increased up to the working temperature limit for PTFE. Accordingly, there occurs no dusting due to the separation of the lubrication film 5 even under the high temperature conditions and hence, the lubricity is not degraded. Particularly, when PTFE has the mean molecular weight of not more than 15,000, the particles are further reduced in size, thus contributing to the further improved lubricity and separation resistance of the film. Further, when PTFE has the mean molecular weight of not less than 7,000, the PTFE does not start producing gas at low temperature, thus contributing to the further improved heat resistance of the film.

As discussed above, the lubrication film 5 can present the excellent heat resistance and lubricity as well as the low dusting characteristic thereby permitting the use of the roller bearing assembly in the special environments such as of high vacuum, high temperature and cleanliness.

According to the above embodiment, the lubrication film 5 is formed on all the surfaces of the balls 3, the raceway tracks 1a and 2a and the retainer 4, but the lubrication film may not be formed on all of the surfaces. As to the gap between the balls 3 and the raceway track (1a, 2a), for example, the lubrication film 5 may be formed on at least either of the balls and the raceway track. Likewise, the lubrication film interposed between the balls 3 and the retainer 4 may be formed on at least either of them. A part to be formed with such a lubrication film 5 is singly dipped in the solution wherein the aforementioned PTFE is dispersed in the organic solvent of the flon substitute. Thereafter, the hot-air drying process is applied to the part at about 100° C. for forming the lubrication film 5 thereon.

The foregoing description of the embodiment has been made by way of example of the roller bearing assembly with the retainer. In the case of a full type ball bearing without the retainer, the lubrication film may be formed on at least either of the balls and the raceway track with which the balls make contact.

Figure 2:
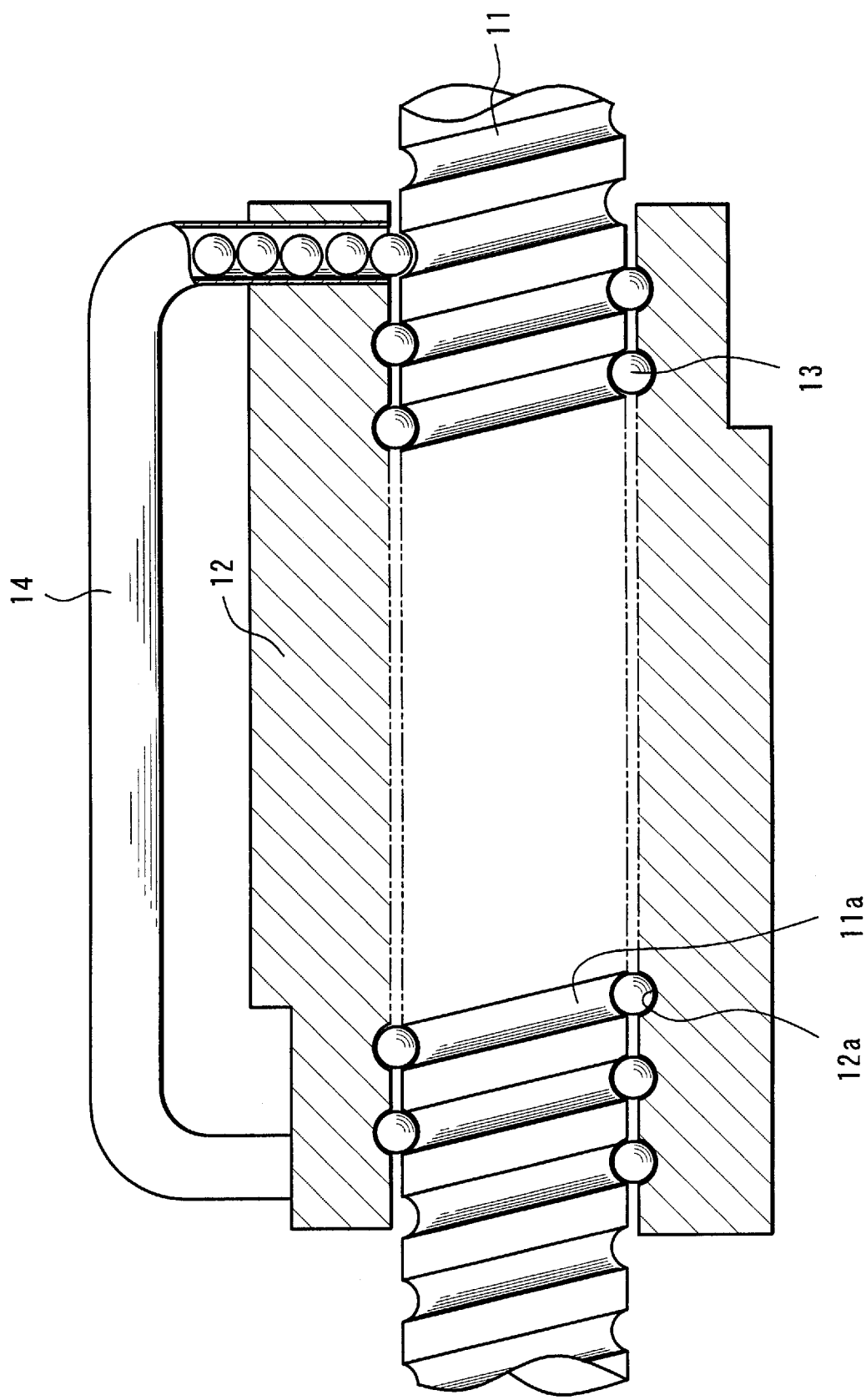
FIG. 2 is a sectional view showing another bearing assembly (ball-thread bearing) to which the same principal configuration as the bearing assembly of FIG. 1 is applied.

FIG. 2 is a sectional view showing another bearing assembly (ball-thread bearing) to which the principal configuration of the bearing shown in FIG. 1 is applied. The ball-thread bearing includes a thread 11, a housing 12, balls 13 and a circulation path 14. An outer circumferential portion of the thread 11 and an inner circumferential surface of the housing 12 are formed with grooves (raceway tracks) 11a and 12a each for guiding the balls 13. Similarly to the aforementioned roller bearing assembly, the lubrication film (not shown) composed of the solid lubricant is formed on at least either of the balls 13 and the grooves (11a, 12a) . In the ball-thread bearing assembly of this configuration, the rotation of the thread 11 causes the balls 13 to roll and move spirally, thereby returning the balls from one end of the housing 12 to the opposite end thereof through the circulation path 14. This causes the housing to move axially.

Similarly to the roller bearing assembly shown in FIG. 1, the ball-thread bearing assembly also permits the use thereof in the special environments such as of high vacuum, high temperature and cleanliness.

Figure 3:
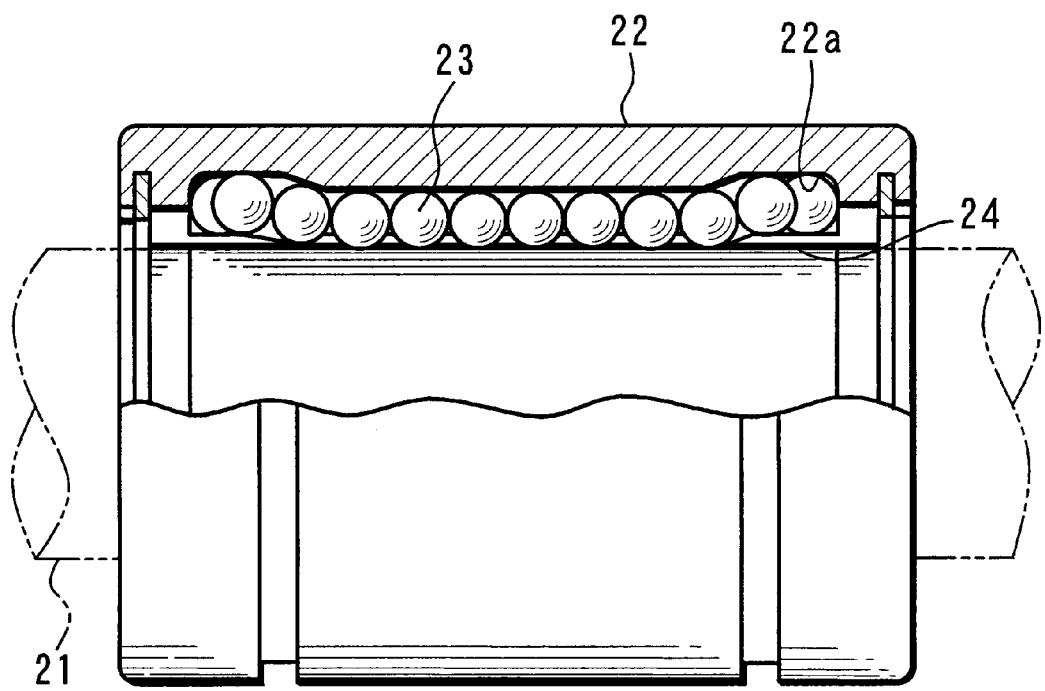
FIG. 3 is a sectional view showing still another bearing assembly (ball-spline bearing) to which the same principal configuration as the bearing assembly of FIG. 1 is applied.

FIG. 3 is a sectional view showing a ball-spline bearing assembly to which the principal configuration of the bearing shown in FIG. 1 is applied. The ball spline bearing includes a spline shaft 21, an outer cylinder 22, balls 23 and a retainer 24. A raceway track 22a for guiding the balls 23 is formed in an inside wall of the outer cylinder 22. The retainer 24 is disposed on the inner side relative to the raceway track 22a thereby retaining the balls 23. Similarly to the aforementioned roller bearing assembly, the lubrication film (not shown) composed of the solid lubricant is formed on at least either of the balls 23 and the raceway track 22a. Additionally, the lubrication film may also be formed on the spline shaft 21 and the retainer 24. In the ball-spline bearing assembly of this configuration, the spline shaft 21 is axially moved relative to the outer cylinder 22, thereby causing the balls 23 to a roll and move in a loop.

Similarly to the roller bearing assembly shown in FIG. 1, the ball-spline bearing assembly also permits the use thereof in the special environments such as of high vacuum, high temperature and cleanliness.

[Service Test]

The heat resistance of the roller bearing shown in FIG. 1 was examined in a vacuum of $10^{-7}$ Torr. A PTFE having a mean molecular weight of 7,500 to 15,000, a mean particle size of 5 µm and a melting point of 315° C. was used for a roller bearing assembly as Embodiment 1. On the other hand, a PTFE having a mean molecular weight of 1,000 to 4,000, a mean particle size of 1.5 µm and a melting point of 200° C. was used for a roller bearing assembly as Comparative Example 1. A solution was prepared by dispersing each of the PTFEs in a flon substitute. Each of the bearings was dipped in each of the resultant solutions and then, the hot-air drying process is applied to the bearing at about 100° C. Thus, each PTFE was made to adhere to the balls, raceway track and retainer.

In the bearing of Embodiment 1, production of gas from the PTFE was not observed until the temperature rose to about 300° C. In the bearing of Comparative Example 1, production of gas from the PTFE was observed at temperature of about 180° C., and thereafter the PTFE was completely evaporated at 250° C. This demonstrates that the bearing assembly of Example 1 permits the use thereof at the temperature of 300° C. whereas the bearing of Comparative Example 1 becomes unable to permit the use thereof at about 200° C.

[Torque Life Test]

Next, a torque life test (lifetime test under the application of torque) was conducted on the roller bearing assembly, and the result is shown as below.

The test was conducted according to the following conditions:

Sample bearing number: 608ST
Atmosphere: atmospheric air and vacuum($1 \times 10^{-7}$ Torr)
Rotation speed: 200 r/m
Load: axial load 50 N
Number of samples: set of 3 samples for each example.

A bearing of Embodiment 2 was processed by the steps of: preparing a solution by dispersing, in the flon substitute, a PTFE having a mean molecular weight of 7,500 to 15,000 and a mean particle size of 5 μm; dipping the bearing assembly in the resultant solution; and subjecting the bearing assembly to the hot air drying at about 100° C. thereby making the PTFE adhere to the balls, the raceway track and the retainer of the bearing.

A bearing of Comparative Example 2 was processed by the steps of: preparing a solution by dispersedly mixing 5 wt % of PTFE having a mean molecular weight of 50,000 and a mean particle size of 15 μm and 25 wt % of polyamide-imide with 70 wt % of N-methyl-2-pyrolidone; applying the resultant dispersion solution to the balls, raceway track and retainer by the bonded film method, thereby making the solid lubricant adhere thereto; and subjecting the lubrication film to a degassing process at 180° C. for 90 minutes. The torque life test was conducted on the bearings of Embodiment 2 and Comparative Example 2 in the atmospheric air and in vacuum, respectively.

Figure 4:
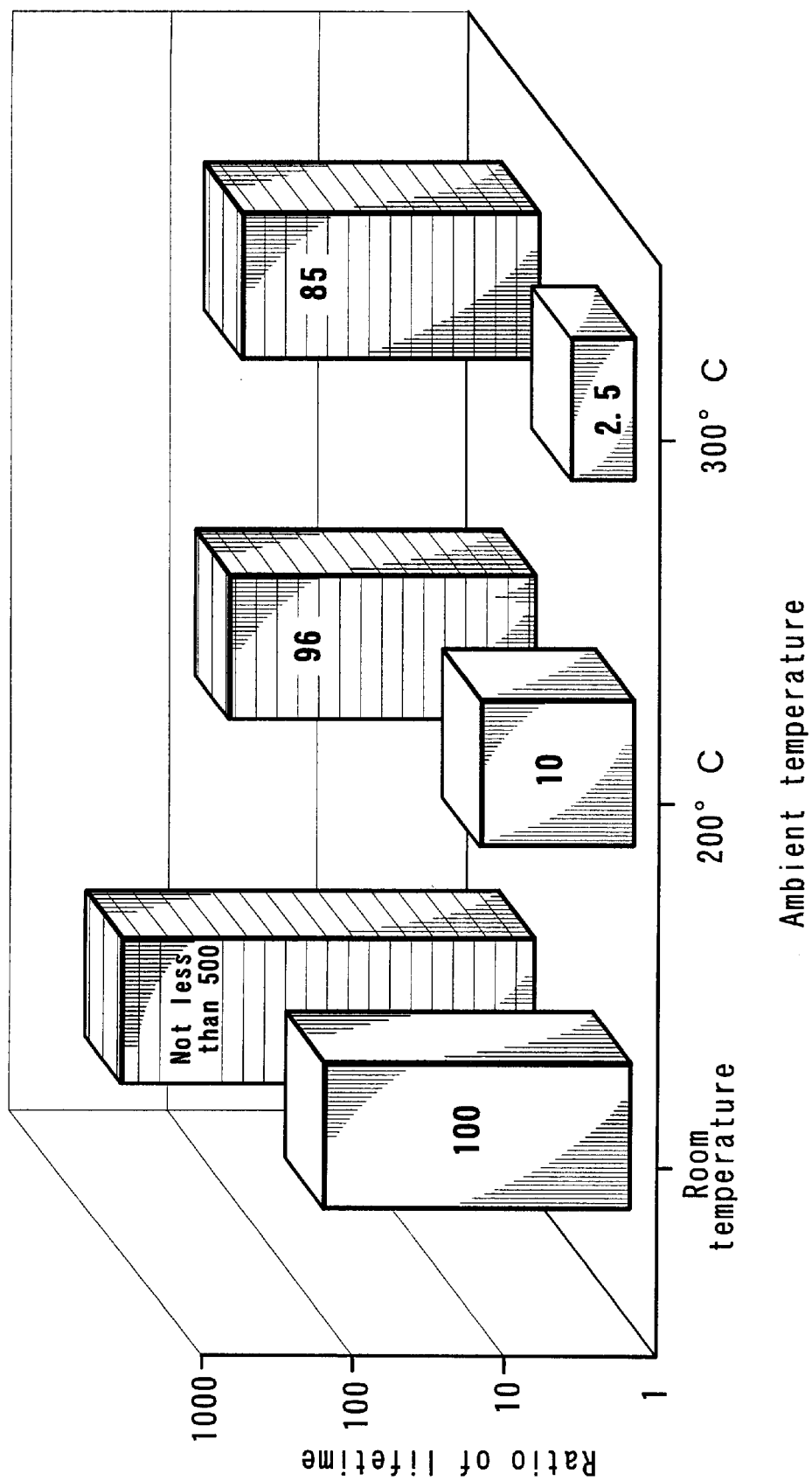
FIG. 4 is a graphical representation of a result of comparison regarding torque lives in the atmospheric environment.
Figure 5:
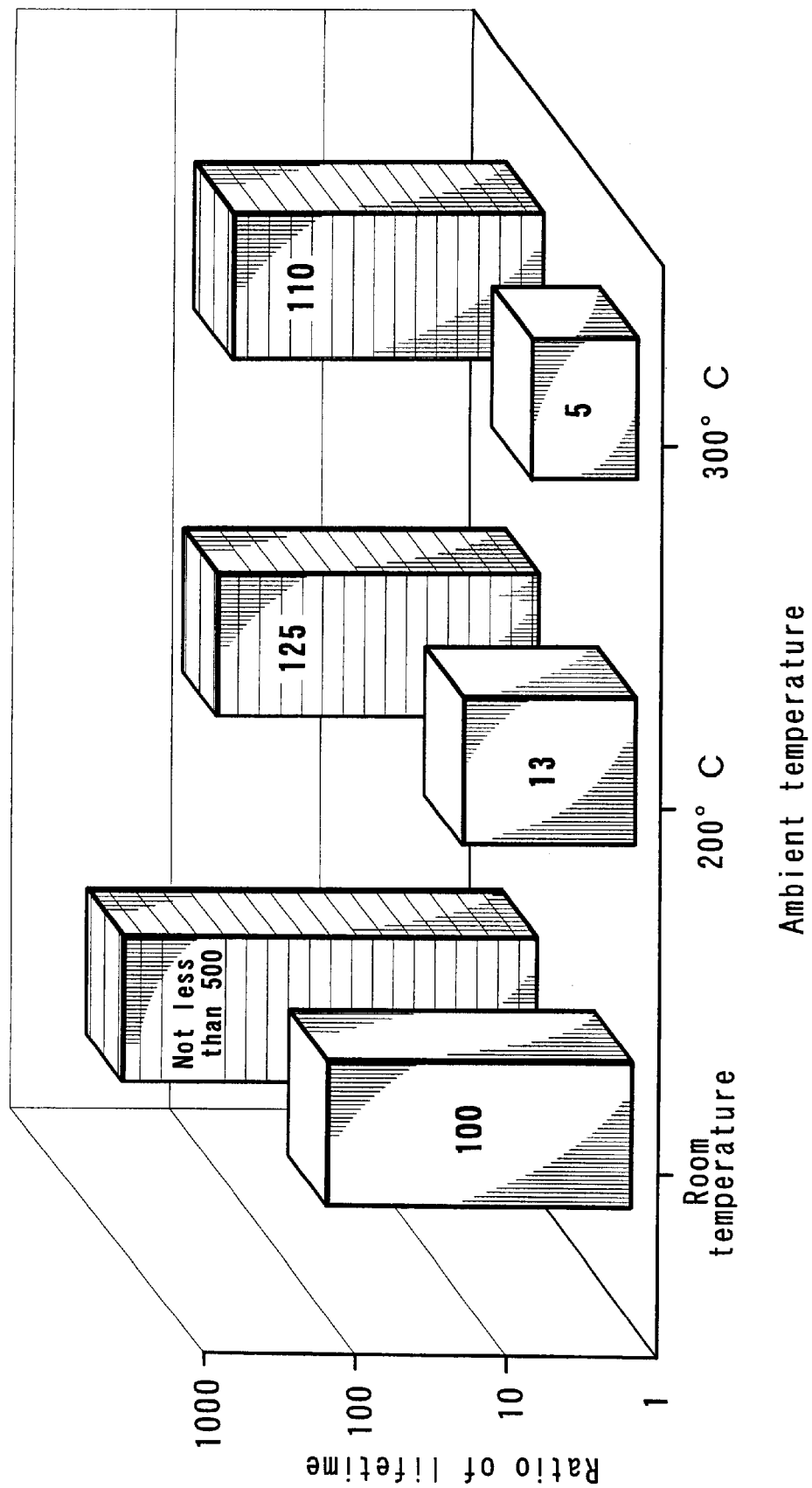
FIG. 5 is a graphical representation of a result of comparison regarding torque lives in vacuum.

FIG. 4 graphically represents the result of the torque life test conducted in the atmospheric air, whereas FIG. 5 graphically represents the result of the torque life test conducted in vacuum. The torque life is represented by ratio of lifetime when a torque life of Comparative Example 2 at a room temperature is made 100.

As is apparent from FIG. 4 and FIG. 5, the bearing configuration according to the embodiment hereof has accomplished a great improvement in the torque life of the bearing both in the atmospheric air and in vacuum.

What is claimed is:

1. A bearing assembly comprising:
   a roller body;
   a raceway track for guiding said roller body; and
   a lubrication film formed of a solid lubricant adhered to at least one of surfaces of said roller body and said raceway track with a property that particles of lubricant are dispersed in binder-less condition, said solid lubricant including polytetrafluoroethylene having a mean molecular weight of not more than 25,000 and a mean particle size of not less than 5 μm and less than 10 μm.

2. A bearing assembly as set forth in claim 1, wherein said polytetrafluoroethylene has a mean molecular weight of between 7,000 and 15,000.

3. A bearing assembly comprising:
   a roller body;
   a raceway track for guiding said roller body;
   a retainer for retaining said roller body; and
   a lubrication film formed of a solid lubricant adhered to at least one of surfaces of said roller body, said raceway track and said retainer with a property that particles of lubricant are dispersed in binder-less condition, said solid lubricant including polytetrafluoroethylene having a mean molecular weight of not more than 25,000 and a mean particle size of not less than 5 μm and less than 10 μm.

4. A bearing assembly as set forth in claim 3, wherein said polytetrafluoroethylene has a mean molecular weight of between 7,000 and 15,000.

* * * * *